United States Patent [19]

Iwasaki

[11] 3,899,931
[45] Aug. 19, 1975

[54] DIAL INDICATOR FOR SENSING SURFACE VARIATIONS

[75] Inventor: Shozo Iwasaki, Ebina, Japan

[73] Assignee: Kabushiki Kaisha, Akashi Seisakusho, Japan

[22] Filed: Dec. 27, 1973

[21] Appl. No.: 428,871

[30] Foreign Application Priority Data
Dec. 30, 1972 Japan.................................. 48-1369

[52] U.S. Cl......................... 74/34; 33/172 R; 73/78
[51] Int. Cl............................................ F16h 19/08
[58] Field of Search............. 74/34; 73/78; 116/115; 33/172 R, 174 R, 174 D

[56] References Cited
UNITED STATES PATENTS

| | | | |
|---|---|---|---|
| 2,130,269 | 9/1938 | Dietert.................................. | 73/78 |
| 2,338,537 | 1/1944 | Podesta.................................. | 73/78 |
| 3,226,836 | 1/1966 | Bond.................................. | 33/172 R |
| 3,307,266 | 3/1967 | Miserocchi........................ | 33/172 R |
| 3,485,091 | 12/1969 | Kornblau.............................. | 73/78 |

*Primary Examiner*—Samuel Scott
*Assistant Examiner*—Wesley S. Ratliff, Jr.
*Attorney, Agent, or Firm*—Robert E. Burns; Emmanuel J. Lobato; Bruce L. Adams

[57] ABSTRACT

A dial indicator for use on apparatus for measuring Rockwell hardness and ovality or out-of-roundness. A sensing spindle is biased axially and movable axially in opposite directions in response to variations in a surface being sensed. The spindle comprises a rack driving a pinion during axial travel thereof for driving an auxiliary pointer with which the reference axial position of the sensing spindle is established. A magnification gear is coupled to the pinion through a slip clutch coupling a main pointer to the sensing spindle. The sensing spindle is stopped by a stop cooperative with the magnification gear to establish a reference position from which indications are made. The reference position of the sensing spindle is a position from which indicated sensing of the sensing spindle is initiated. The use of the auxiliary pointer results in a precise reference condition being established for the dial indicator.

4 Claims, 6 Drawing Figures

DIAL INDICATOR FOR SENSING SURFACE VARIATIONS

BACKGROUND OF THE INVENTION

The present invention relates to dial indicators and more particularly an indicator for use in Rockwell hardness testers and ovality and out-of-roundness indicating apparatus.

In the conventional dial indicators, for example in Rockwell hardness testers, the dial is rotated to a zero or reference position when the indenter is preloaded. Establishing the reference condition requires the use of weights and complicates the apparatus.

Other dial indicators provide an auxiliary pointer having a lower sensitivity than the main indicator pointer. The auxiliary pointer is used to establish the reference position. However, the auxiliary pointer is generally very short so that it does not in any way conflict with the main pointer and moves relative to the dial plate. This type of structure has a shortcoming in that it is not easy to adjust the auxiliary pointer itself to precise graduations indicating a reference position or condition.

SUMMARY OF THE INVENTION

It is a principal object of the present invention to provide an indicator that greatly simplifies surface sensing indications.

Another object of the present invention is to provide an indicator that establishes a reference position for the indicating pointer in conjunction with a sensing spindle and an auxiliary pointer establishes the initial axle position of the sensing spindle from which indications are to be taken.

The indicator according to the invention comprises a sensor or sensing spindle for sensing variations of a surface to be sensed and is movable axially in opposite directions in response to the variations in the surface being sensed. It is biased in a direction for engaging the surface to be sensed. Rotatable means comprising a rack and pinion combination drive the auxiliary sensor proportionately to the axial movement of the sensing spindle. An indicating pointer is actuated by a magnification sector gear coupled to the rack and pinion through a slip clutch. The slip clutch is operative automatically to declutch the indicating pointer from the rack and pinion when a reference position thereof is reached. The reference position is established with a stop which allows the spindle to remain movable so that an auxiliary indicator driven by the pinion continues to move in response to the spindle proportionately to its axial movement for establishing a reference-sensing axial position of the sensing spindle from which the indicated sensing is initiated.

BRIEF DESCRIPTION OF THE DRAWING

Other objects and advantages of the indicator according to the invention will appear from the following description of an example of the invention and the novel features will be particularly pointed out in the appended claims and drawings in which:

DESCRIPTION OF THE PREFERRED EMBODIMENTS

Figure 1:
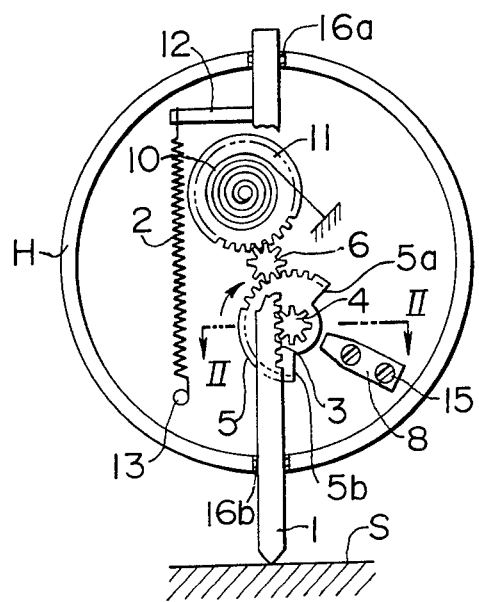
FIG. 1 is a rear view of an indicator according to the invention.

As illustrated in FIG. 1 the indicator according to the invention comprises a dial H having opposed openings through which extends a sensing spindle 1 movable axially and biased by a spring 2 in a direction for contacting and sensing a surface S, for detecting variations thereof as later explained, which are to be sensed and indicated. The sensing spindle comprises a gear rack 3 meshing with a drive pinion 4 that drives a magnification sector gear 5 coaxial therewith for driving a second pinion 6 that drives an indicating pointer P as hereinafter explained.

The indicating pointer P is secured to the driven pinion 6 by a shaft $O_1$ and is coupled to the drive pinion 4 by means of a friction or slip clutch 7 comprising a compression spring 7a and a ring 7b about the axis of the drive pinion. A fixed stop 8 is provided on the dial for limiting the angular movement of the magnification gear 5. The magnification gear is provided with abutment surfaces 5a, 5b that engage the fixed stop 8 whenever the spindle 1 is moved axially sufficiently in opposite directions so that the corresponding abutment surface is engaged with the stop.

The stop 8, in cooperation with the magnification gear establishes, an initial reference indicating position of the main or indicating pointer P. Thus when the sensing spindle 1 is moved axially so that the magnification gear rotates clockwise, the abutment surface 5a contacts the stop 8 when the indicating pointer P reaches a reference position Q.

Since the spindle 1 can continue axial movement the indicating reference position of the indicating pointer is maintained by virtue of the fact that the slip clutch 7, which is a frictional clutch, will allow slippage to take place so that the magnification gear is not rotatably driven even though the pinion 4 may continue to move in response to the axial travel of the sensing spindle 1. Thus a very accurate reference indicating position for the pointer P is established.

A spring 10 is anchored at one end and secured to the axis of a backlash gear 11 which precludes any backlash in the driven pinion 6 driving the indicating pointer P as indicated heretofore. A pin 12 is secured to the sensing spindle and a pin 13 secured to the dial provide anchorage and connection for the biasing spring 2 to the sensing spindle. Screws 15 secure the stop to the dial indicator.

The dial H is provided with openings having bearings 16a, 16b so that the movement of the sensing spindle axially is through a wide range of movement. However, a limit stop, not shown, may be provided on the dial or spindle.

In order to establish an initial or reference sensing position of the sensing spindle 1, an auxiliary pointer $P_a$ is provided on an axis $O_2$ connected to the drive pinion and spaced from an axis $O_1$ of the indicator pointer P. The auxiliary pointer $P_a$ has a large arcuate portion to allow it to move into position about the axis of the main indicating pointer P so that the movement of the sensing spindle 1 can be initially set by moving it to the position at which the auxiliary pointer Pa is moved to a reference position between reference limit or range graduations Q1, Q2. It is, of course, understood that the axial positioning of the sensing spindle is effected by relative movement between it and the surface S. The auxiliary pointer Pa is a large pointer and allows easy adjustment to the range graduations Q1, Q2 and accurate reading relative thereto.

Figure 4:
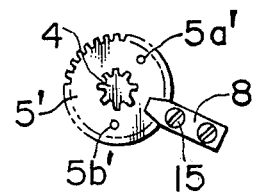
FIG. 4 is a fragmentary rear view of a variation of a part of the indicator illustrated in FIG. 1.
Figure 2:
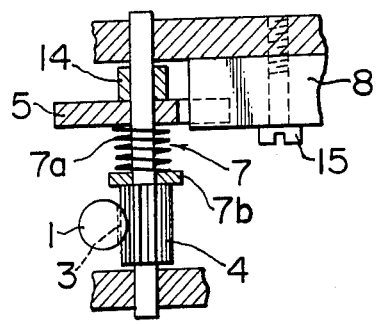
FIG. 2 is a fragmentary cross section view taken at section line II—II of FIG. 1.
Figure 3:
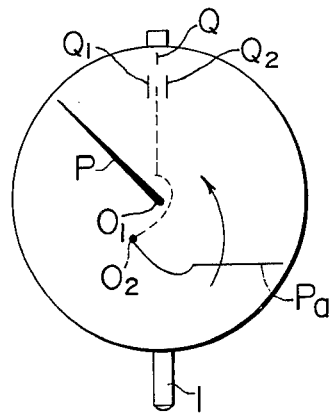
FIG. 3 is a front face view of the indicator in FIG. 1.

A variation of the indicator described is illustrated in FIG. 4 in which parts corresponding to those of the embodiment in FIG. 1 have corresponding reference numerals. In this structure a magnification gear 5′, 5b′ coactive with a fixed stop 8 that establish the initial or reference indicating position of the indicating pointer. The operation of this second indicator is the same as that already described.

Figure 6:
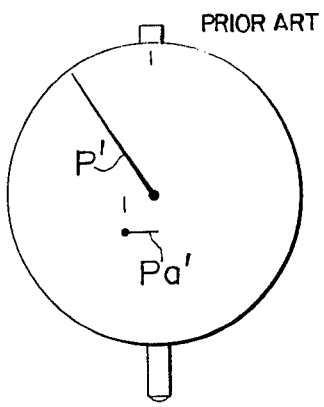
FIG. 6 is a front view of a prior art indicator.

In contrast with the present invention, the prior art dial indicator, as illustrated in FIG. 6, comprise a dial with an indicator pointer P′ and an auxiliary pointer $P_a'$ The latter pointer is very small and positioning it with respect to the reference position is troublesome as well as the fact that establishing the relative reference positions of the principal indicator and the initial indicating position of the sensor is complex.

Figure 5:
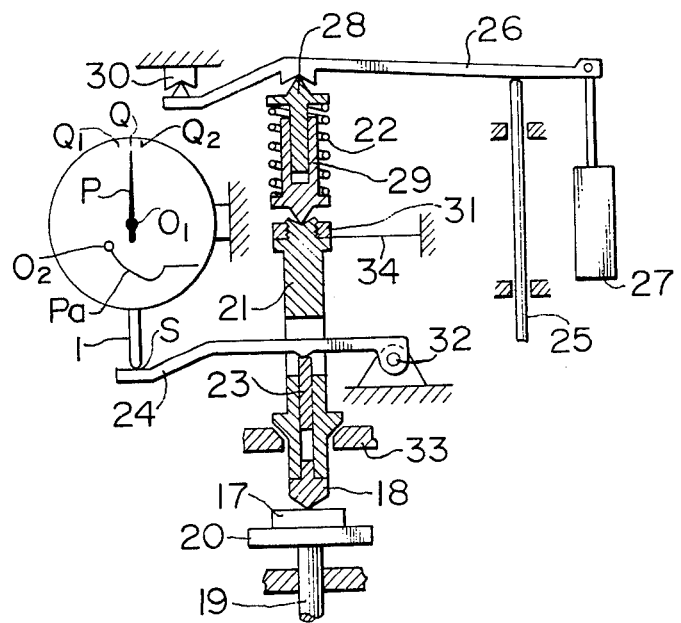
FIG. 5 is a schematic illustration of an application of the indicator of FIG. 1 to a Rockwell hardness tester according to the invention.

An illustration of the application of the indicator to a Rockwell hardness tester is illustrated in FIG. 5. A metallic specimen 17 whose hardness is to be tested by an indenter 18 is movable relative to the indenter 18 by a shaft 19 supporting a table 20 on which the specimen 17 is disposed. The indenter is part of an indenter shaft 21 biased into engagement with the surface of the specimen 17 and will load a load spring 22 with a load, a load corresponding to a standardized load of Rockwell hardness testers as later described. Within the indenter shaft, a contact member 23 supports magnifying lever 24 pivotally mounted on a pivot 32 and extending through the indenter shaft.

A weight arm or load lever 26 is controlled by a control bar 25 for controlling the application to the apparatus of a weight 27 as later described. The load lever 26 is seated on a pivot piston or load shaft 28 of the indenter mechanism housed within guide cylinder 29. The load lever 26 is pivoted on a fixed pivot 30 as illustrated. A stop nut 33 is disposed circumferentially of the indenter 18 for regulating the travel of the indenter and a plate spring supports the indenter shaft 21.

In order to establish the reference conditions of the indicator described heretofore, the shaft 19 is moved axially so that the specimen 17 engages the indenter 18 so that the magnifying lever 24 is actuated so that the sensor 1 sensing a surface S thereof is moved axially so that the indicating pointer P is moved to its reference position Q. Continued movement of the specimen by the table will actuate the sensor 1 so that the auxiliary pointer $P_a$ is moved to a position between the reference or range graduations Q1, Q2. This corresponds to the preloaded condition of the load spring 22 and corresponds to the use of a standardized preload in conventional Rockwell Hardness testers. Thus the initial reading conditions corresponding to a preloading of the conventional Rockwell hardness tester is established.

In order to take a reading, the control bar 25 releases the load lever 26 so that the load or weight 27 drives the indenter 18 into the surface of the specimen 17 and this will allow the movement of the magnifying lever 24 so that its surface S being sensed allows movement of the sensor 1 axially so that an indication is possible as the indicating pointer P moves away from its abutment and stop and an accurate reading is taken on the graduations provided on the indicator.

I claim:

1. An indicator comprising, a sensing spindle for sensing variations of a surface to be sensed and movable axially in opposite directions in response to variations in the surface being sensed, rotatable means responsive to the axial movement of the sensing spindle, an indicating pointer actuated angularly by said rotatable means, a slip clutch coupling the pointer to said rotatable means and having means to declutch the pointer from said rotatable means when said pointer is disposed at a reference position, an auxiliary pointer connected to said rotatable means continuously movable in response to the axial movement of said sensing spindle and movable proportionately to said axial movement for establishing and indicating a reference sensing axial position of said sensing spindle from which indicated sensing of said sensing spindle is indicated by said indicating pointer, means biasing said spindle in a direction for sensing said surface, and said indicating pointer indicating a variation of said sensing spindle from said reference position thereof.

2. An indicator according to claim 1, in which said sensing spindle comprises a rack, said rotatable means comprising a pinion meshing with said rack and a magnification gear coaxial with said pinion and driven thereby, and said slip clutch comprising means for coupling said magnification gear to said pinion.

3. An indicator according to claim 2, including a mechanical stop for limiting travel of said magnification gear to establish said reference position of said indicating pointer and to render said means in said slip clutch effective to declutch said magnification gear from said pinion.

4. An indicator according to claim 1, including a mechanical stop cooperative with said rotatable means for limiting travel of said sensing spindle to establish said reference position thereof, and means in said slip clutch effective to render said slip clutch effective to declutch said indicating pointer from said rotatable means when said mechanical stop limits the travel of said rotatable means.

* * * * *